(12) United States Patent
Kanemoto et al.

(10) Patent No.: US 9,899,653 B2
(45) Date of Patent: Feb. 20, 2018

(54) ALKALINE STORAGE BATTERY, AND METHOD FOR PRODUCING ALKALINE STORAGE BATTERY

(71) Applicant: GS Yuasa International Ltd., Kyoto-shi, Kyoto (JP)

(72) Inventors: Manabu Kanemoto, Kyoto (JP); Tadashi Kakeya, Kyoto (JP); Mitsuhiro Kodama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 501 days.

(21) Appl. No.: 14/496,717

(22) Filed: Sep. 25, 2014

(65) Prior Publication Data

US 2015/0093618 A1  Apr. 2, 2015

(30) Foreign Application Priority Data

Sep. 30, 2013  (JP) .................................. 2013-204383

(51) Int. Cl.
| | |
|---|---|
| *H01M 10/04* | (2006.01) |
| *H01M 2/16* | (2006.01) |
| *H01M 10/30* | (2006.01) |
| *H01M 2/14* | (2006.01) |
| *H01M 10/28* | (2006.01) |

(52) U.S. Cl.
CPC .......... *H01M 2/162* (2013.01); *H01M 2/145* (2013.01); *H01M 2/1686* (2013.01); *H01M 10/0431* (2013.01); *H01M 10/286* (2013.01); *H01M 10/30* (2013.01); *H01M 2220/20* (2013.01); *Y02E 60/124* (2013.01); *Y02P 70/54* (2015.11); *Y10T 29/49115* (2015.01)

(58) Field of Classification Search
None
See application file for complete search history.

(56) References Cited

U.S. PATENT DOCUMENTS 5,830,603 A * 11/1998 Oka ..................... H01M 2/145
                                                         204/296
7,052,800 B2   5/2006 Nohma
7,790,306 B2   9/2010 Harada

FOREIGN PATENT DOCUMENTS

| | | |
|---|---|---|
| JP | H06020673 | 1/1994 |
| JP | H07-263018 | 10/1995 |
| JP | 2002063890 A2 | 2/2002 |
| JP | 2002157988 A2 | 5/2002 |
| JP | 2003068270 A2 | 3/2003 |
| JP | 2003068353 A2 | 3/2003 |
| JP | 2003-257474 | 9/2003 |
| JP | 2004031293 A2 | 1/2004 |

(Continued)

OTHER PUBLICATIONS

JP2004031293A—Machine Translation.*

*Primary Examiner* — Sarah A. Slifka
*Assistant Examiner* — Haroon S. Sheikh
(74) *Attorney, Agent, or Firm* — Rankin, Hill & Clark LLP

(57) ABSTRACT

An alkaline storage battery includes a spiral electrode group with a positive plate and a negative plate spirally wound with a separator interposed therebetween. The separator includes a plurality of sulfone group-containing regions. The plurality of sulfone group-containing regions are separated from one another in a winding direction, and disposed to face the positive plate or the negative plate.

15 Claims, 8 Drawing Sheets

(56) References Cited

FOREIGN PATENT DOCUMENTS

| | | | |
|---|---|---|---|
| JP | 2005135730 | A2 | 5/2005 |
| JP | 2005310625 | A2 | 11/2005 |
| JP | 2007207525 | A2 | 8/2007 |
| JP | 2007207526 | A2 | 8/2007 |
| JP | 2007258075 | A2 | 10/2007 |
| JP | 2013-122862 | | 6/2013 |

\* cited by examiner

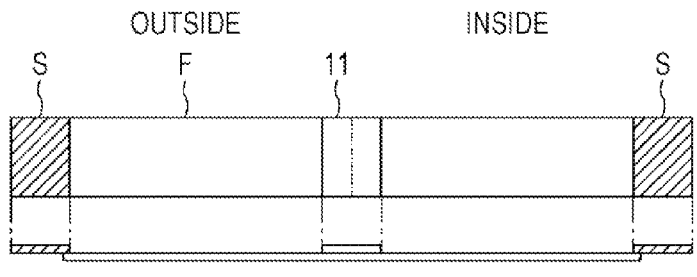
FIG. 8A No.1
FRONT SURFACE
SIDE SURFACE
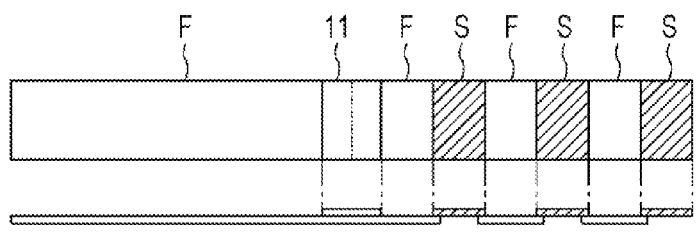
FIG. 8B No.2
FRONT SURFACE
SIDE SURFACE
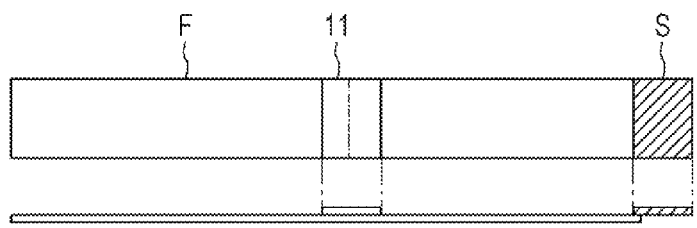
FIG. 8C No.3
FRONT SURFACE
SIDE SURFACE
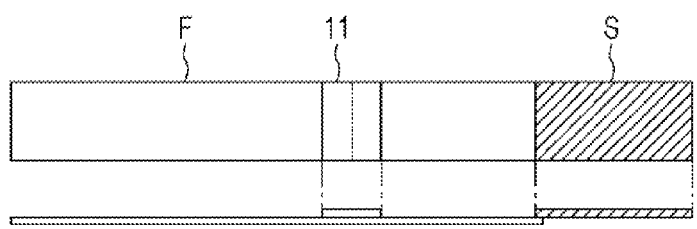
FIG. 8D No.4
FRONT SURFACE
SIDE SURFACE
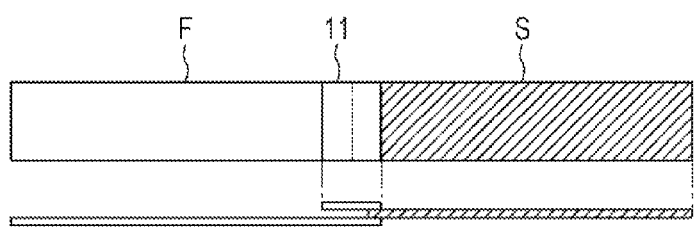
FIG. 8E No.5
FRONT SURFACE
SIDE SURFACE

ALKALINE STORAGE BATTERY, AND METHOD FOR PRODUCING ALKALINE STORAGE BATTERY

CROSS-REFERENCE TO RELATED APPLICATIONS

This application is based on Japanese Patent Application No. 2013-204383 filed on Sep. 30, 2013, the entire contents of which is hereby incorporated by reference.

FIELD

The present invention relates to an alkaline storage battery and a method for producing an alkaline storage battery.

BACKGROUND

Recently, high-power alkaline storage batteries such as nickel-metal hydride storage batteries and nickel-cadmium storage batteries have been used as power sources for electric vehicles, hybrid vehicles, power-assisted bicycles, electric power tools and so on.

As a separator to be used in an alkaline storage battery, for example a nonwoven fabric composed of polyolefin-based fibers excellent in alkali resistance is used. However, polyolefin-based fibers are poor in affinity with an alkaline electrolyte solution, and is therefore required to be subjected to a hydrophilic treatment to improve hydrophilicity. Thus, the nonwoven fabric composed of polyolefin-based fibers is used as a separator for an alkaline storage battery after being subjected to various hydrophilic treatments such as a sulfonation treatment, a fluorine gas treatment, a corona discharge treatment and a graft polymerization treatment.

A separator into which sulfone groups are introduced by a sulfonation treatment or the like is known to suppress self discharge and contribute to capacity retention by trapping nitrogen-based impurities (ammonium salts) remaining in a positive active material.

However, the sulfonation treatment for introducing sulfone groups is complicated and takes time because a separator is immersed in concentrated sulfuric acid, then neutralized, washed with a large amount of water, and dried. Therefore, a separator into which sulfone groups are introduced by a sulfonation treatment or the like is produced at a high production cost.

When a sulfonation treatment is performed, carbon-carbon bonds in polyolefin-based fibers are broken, and therefore the mechanical strength of a separator having sulfone groups is easily reduced.

Further, it is difficult to sufficiently sulfonate the insides of fibers even by a sulfonation treatment, and therefore a separator having sulfone groups has low liquid retainability and is poor in cycle life performance and high rate discharge performance (JP-A-2005-310625).

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In view of the current situations described above, the present invention is to provide an alkaline storage battery which is excellent in capacity retention performance even with a small size of sulfone group-containing regions, and a method for producing an alkaline storage battery.

The present inventors have extensively conducted studies, and resultantly found that by dispersing sulfone group-containing regions in a separator, high capacity retention characteristics are obtained even with a small size of sulfone group-containing regions.

That is, the alkaline storage battery according to an aspect of the present invention is an alkaline storage battery including a spiral electrode group with a positive plate and a negative plate spirally wound with a separator interposed therebetween, wherein the separator includes a plurality of sulfone group-containing regions, and the plurality of sulfone group-containing regions are separated from one another in a winding direction, and disposed to face the positive plate or the negative plate.

BRIEF DESCRIPTION OF THE DRAWINGS

The foregoing and other features of the present invention will become apparent from the following description and drawings of an illustrative embodiment of the invention in which:

FIG. 8A shows a front view and a side view in an extended state of a separator used in a battery subjected to evaluation of a remaining capacity retention ratio;

FIG. 8B shows a front view and a side view in an extended state of a separator used in a battery subjected to evaluation of a remaining capacity retention ratio;

FIG. 8C shows a front view and a side view in an extended state of a separator used in a battery subjected to evaluation of a remaining capacity retention ratio;

FIG. 8D shows a front view and a side view in an extended state of a separator used in a battery subjected to evaluation of a remaining capacity retention ratio; and FIG. 8E shows a front view and a side view in an extended state of a separator used in a battery subjected to evaluation of a remaining capacity retention ratio.

DESCRIPTION OF EMBODIMENT

Figure 1A:
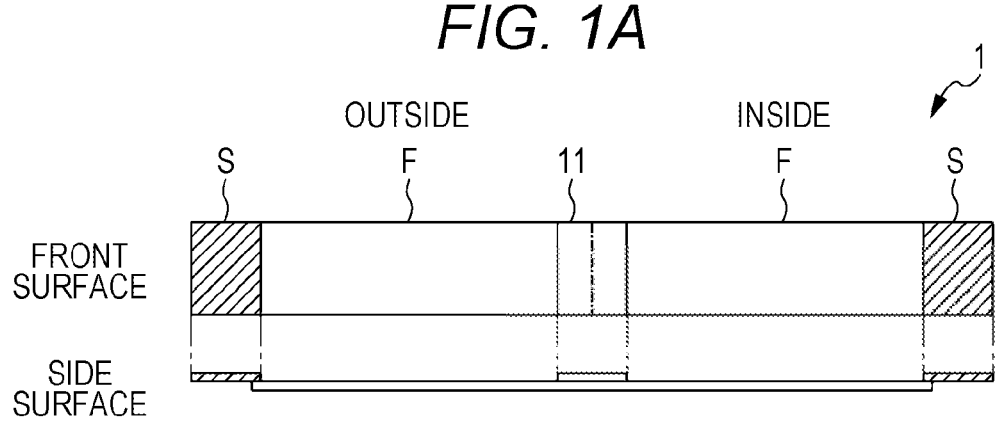
FIG. 1A shows a front view and a side view in an extended state of a separator according to a first embodiment.

The alkaline storage battery according to an aspect of the present invention is an alkaline storage battery including a spiral electrode group with a positive plate and a negative plate spirally wound with a separator interposed therebetween, wherein the separator includes a plurality of sulfone group-containing regions, and the plurality of sulfone group-containing regions are separated from one another in a winding direction, and disposed to face the positive plate or the negative plate.

Here, the "sulfone group-containing region" refers to a region in which a sulfone group is detected using, for example, an analysis with IR or the like, and a sulfonation treatment or other methods may be used for a process for bonding sulfone groups.

Particularly, it is preferred that at least one of the plurality of sulfone group-containing regions is disposed between the outer periphery of the electrode group and a case storing the electrode group.

It is preferred that the separator is one sheet-shaped article, and includes a plurality of sulfone group-containing regions separated from one another in a longitudinal direction of the sheet-shaped article.

At least one of the plurality of sulfone group-containing regions may be formed on one surface of the separator, the region formed on the one surface being disposed to face the positive plate or the negative plate.

Some of the plurality of sulfone group-containing regions may be disposed to face both the positive plate and the negative plate.

At least one of the plurality of sulfone group-containing regions other than the end may be disposed on one side with substantially a center of the separator in the longitudinal direction as a boundary.

Particularly, it is preferred that at least one of the plurality of sulfone group-containing regions other than the end is disposed to face an inner periphery side of the positive plate.

The total of the areas of the plurality of sulfone group-containing regions may be less than 30% of the area of the positive plate.

A method for producing an alkaline storage battery according to another aspect of the present invention may be a method in which a positive plate, a negative plate and a separator including a plurality of sulfone group-containing regions which are separated from one another are superimposed such that the plurality of sulfone group-containing regions are disposed to face the positive plate or the negative plate.

As the method for producing an alkaline storage battery, it is preferred that the positive plate, the negative plate and the separator are spirally wound and superimposed.

According to the aspects of the present invention, owing to the configuration described above, an alkaline storage battery excellent in capacity retention characteristics can be obtained even with a separator having a small size of sulfone group-containing regions.

Embodiments of the present invention will be described in detail below.

A separator according to an embodiment of the present invention is composed of a long sheet-shaped article.

An example of the sheet-shaped article is a nonwoven fabric composed of fibers made of a polyolefin-based resin such as a polyethylene-based resin or a polypropylene-based resin. The nonwoven fabric can be produced by, for example, a dry method, a wet method, a spunbonding method, a melt blow method or the like, but it is preferable to produce the nonwoven fabric by a wet method from the viewpoint of denseness.

The separator according to the embodiment of the present invention is a separator containing sulfone groups in a plurality of regions separated from one another in the sheet-shaped article.

Such a separator is formed with sulfone group-containing regions dispersed in the separator, and therefore can efficiently trap nitrogen-based impurities dissolved in an electrolyte solution.

The separator according to the embodiment of the present invention has sulfonic acid groups ($—SO_3H$) introduced into fibers of the nonwoven fabric by treating the nonwoven fabric etc. with sulfuric acid, fuming sulfuric acid or the like. Whether a region contains a sulfone group can be checked by analyzing each region by Fourier-transform infrared spectroscopy (FT-IR). That is, a region can be confirmed to contain a sulfone group when it has an infrared light absorption peak originating from $S=O$ stretching at 1090 $cm^{-1}$ to 1130 $cm^{-1}$ in the above-mentioned analysis.

The separator according to the embodiment of the present invention is situated such that a plurality of sulfone group-containing regions are separated from one another in a winding direction when a layered product including the separator, a positive plate and a negative plate is wound into a spiral electrode group, and the spiral electrode group is stored in a cylindrical battery case. When a separator containing regions with different treatments is disposed in a battery as described above, level differences and areas having different strengths are generated at boundaries between the treatments. When regions with different treatments are separated from one another in a winding axis direction in winding of the spiral electrode group, the boundaries are generated throughout the electrode in the winding direction, so that defects such as a reduction in strength of the separator and occurrence of an inadequate distance between electrodes occurs due to generation of level differences, and therefore production is not easy. On the other hand, in the separator according to the embodiment of the present invention, such boundaries are generated at only a part of the electrode in the winding direction, so that the foregoing defects are hard to occur, and production is relatively easy.

In the separator according to the embodiment of the present invention, it is preferred that a sulfone group-containing region is formed at one end of the sheet-shaped article in the longitudinal direction.

When a layered product including a separator, a positive plate and a negative plate is wound into a spiral electrode group, and the spiral electrode group is stored in a cylindrical battery case, a slight gap is generated between the electrode group and the battery case to facilitate movement of an electrolyte solution at the peripheral edge as compared to the center of the inside of the battery case. Accordingly, nitrogen-based impurities which are produced inside the positive plate reach the peripheral edge of the inside of the battery case. At this time, when a sulfone group-containing region is formed at one end of the separator in the longitudinal direction, the end at which a sulfone group-containing region is formed is disposed on the peripheral edge of the inside of the battery case when the separator is folded in half and wound into a spiral electrode group. Consequently, the sulfone group-containing region comes into proper contact with an electrolyte solution retained in a gap between the spiral electrode group and the battery case, so that nitrogen-based impurities dissolved in the electrolyte solution can be effectively trapped.

At least one of the plurality of sulfone group-containing regions according to the embodiment of the present invention may be formed on one surface of the separator, the regions formed on the one surface being disposed to face the positive plate or the negative plate. In the present embodiment, nitrogen-based impurities can be trapped by disposing sulfone group-containing regions on one surface of the separator, and therefore high capacity retention characteristics can be maintained. Since sulfone group-containing regions are disposed on only one surface, the separator can be more easily prepared as compared to a case where sulfone group-containing regions are disposed on both surfaces.

Some of the plurality of sulfone group-containing regions according to the embodiment of the present invention may be disposed to face both the positive plate and the negative plate. In the present embodiment, nitrogen-based impurities can be trapped from either of positive and negative plates by disposing the sulfone group-containing regions so as to face both the positive plate and the negative plate.

In the separator according to the embodiment of the present invention, it is preferred that sulfone group-containing regions other than the ends are formed on only one side with substantially the center of the sheet-shaped article in the longitudinal direction as a boundary. Further, it is preferable that the sulfone group-containing regions other than the ends are disposed to face the inner periphery side of the positive plate of the spiral electrode group.

When sulfone group-containing regions poor in strength are formed on the outer periphery side of the positive plate of the spiral electrode group, fragments and powders based on cracking and burrs of the positive plate and chipping and damage of the active material, etc. easily penetrate through the separator to cause a short-circuit. On the other hand, even through cracking and burrs of the positive plate and chipping and damage of the active material occur, occurrence of a short-circuit associated therewith can be prevented by folding the separator according to the embodiment of the present invention in half, sandwiching the positive plate in the middle of the folded separator, disposing a side, on which sulfone group-containing regions are formed, at the inside of the positive plate, and disposing a side, which does not have a sulfone group, at the outside of the positive plate when sulfone group-containing regions are disposed on only one side with substantially the center of the separator in the longitudinal direction as a boundary.

The ratio of sulfone group-containing regions in the separator according to the embodiment of the present invention may be 30% or less of the surface area of the sheet-shaped article. In the present embodiment, sulfone group-containing regions are dispersed in the separator, and therefore even though the ratio of sulfone group-containing regions is 30% or less of the surface area of the sheet-shaped article, nitrogen-based impurities can be efficiently trapped, so that high capacity retention performance can be maintained. Further, when the ratio of sulfone group-containing regions is 30% or less of the surface area of the sheet-shaped article, reduction of the strength of the separator can be prevented, and deterioration of liquid retainability can be prevented to improve cycle life performance. Further, production costs can be reduced.

Preferably, the separator according to the present invention is hydrophilic in its entirety including sulfone group-containing regions. Therefore, when a material poor in hydrophilicity, such as a nonwoven fabric made of a polyolefin-based resin is used as the sheet-shaped article, it is preferred that regions other than sulfone group-containing regions are subjected to another hydrophilic treatment. The hydrophilic treatment other than the sulfonation treatment is preferably a fluorine gas treatment from the viewpoint of mechanical strength, liquid absorption, cycle life performance and so on.

The fluorine gas treatment is performed by, for example, treating the nonwoven fabric using a mixed gas obtained by mixing an oxygen gas, a carbon dioxide gas, a sulfur dioxide gas and the like with a fluorine gas diluted with an inert gas. Hydrophilic groups such as OH, COOH and $SO_3H$ are introduced into fibers of the nonwoven fabric through the fluorine gas treatment.

All regions except sulfone group-containing regions may be subjected to the fluorine gas treatment, but some regions may be subjected to the fluorine gas treatment while other regions may be subjected to another hydrophilic treatment.

Figure 1B:
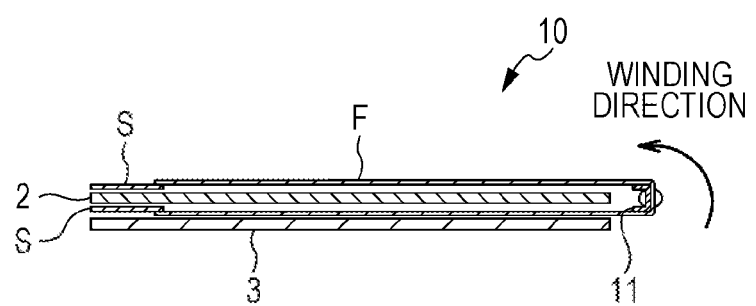
FIG. 1B shows a method for producing a spiral electrode group using the separator.
Figure 2:
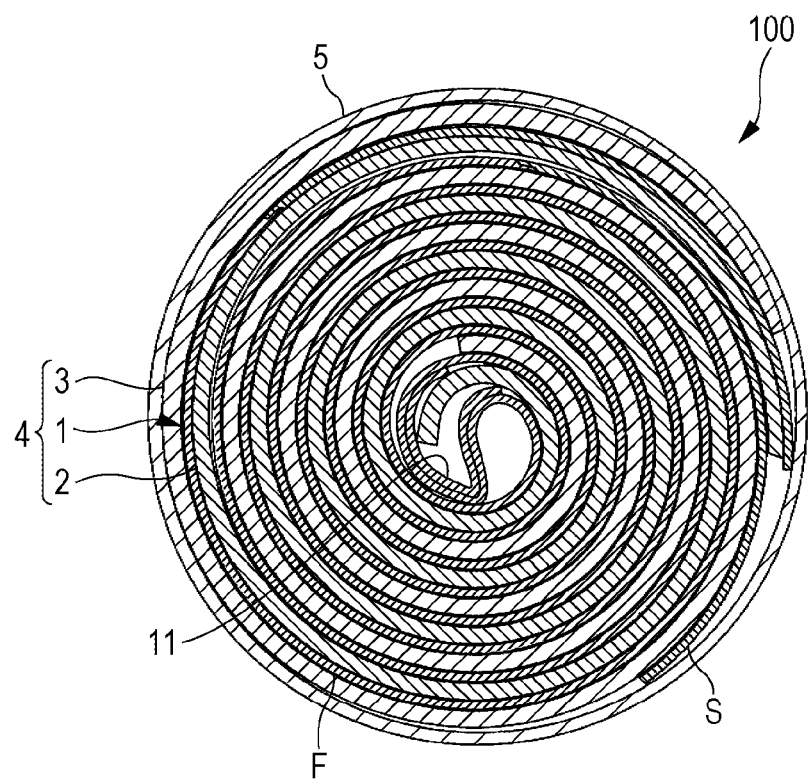
FIG. 2 is a cross-sectional view of a battery using the separator according to the first embodiment.
Figure 3A:
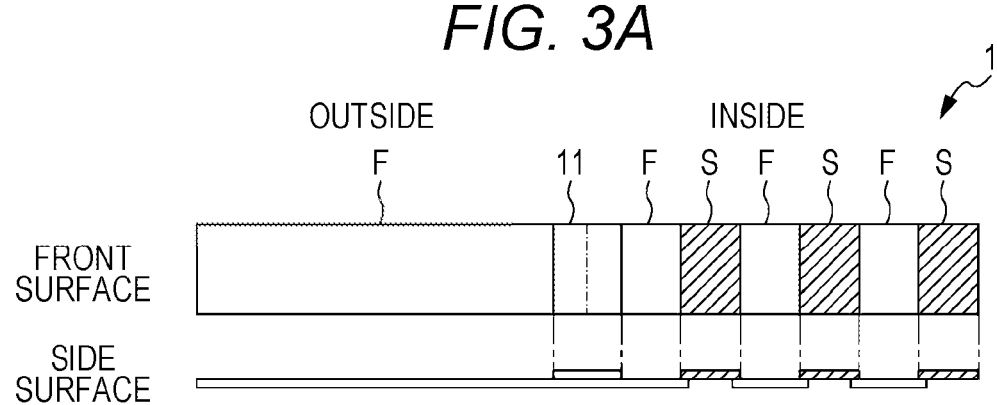
FIG. 3A shows a front view and a side view in an extended state of a separator according to a second embodiment.
Figure 3B:
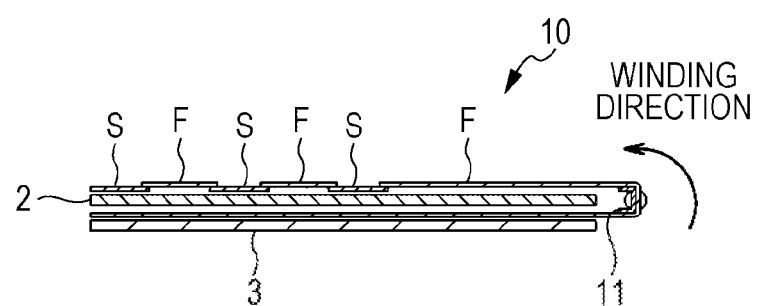
FIG. 3B shows a method for producing a spiral electrode group using the separator.
Figure 4:
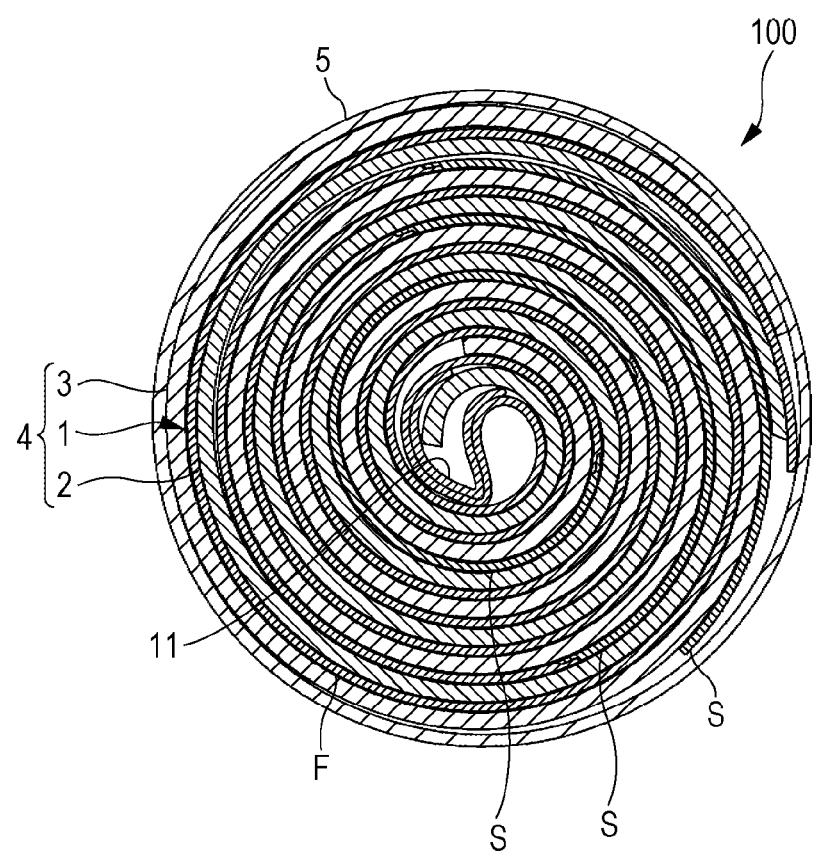
FIG. 4 is a cross-sectional view of a battery using the separator according to the second embodiment.
Figure 5A:
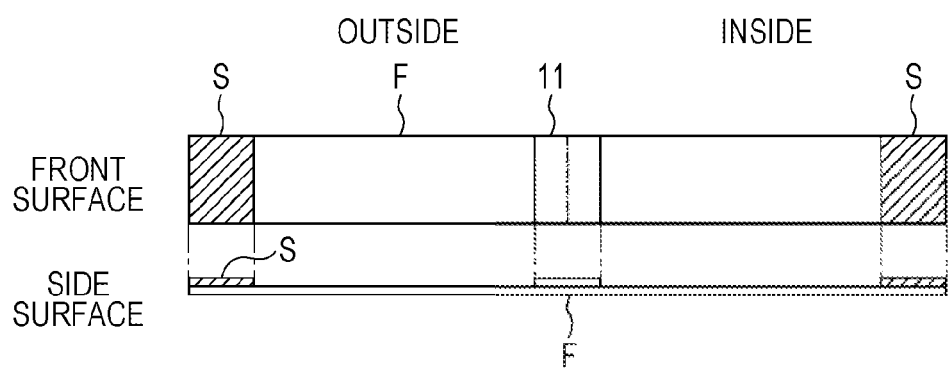
FIG. 5A shows a front view and a side view in an extended state of a separator according to a third embodiment.
Figure 5B:
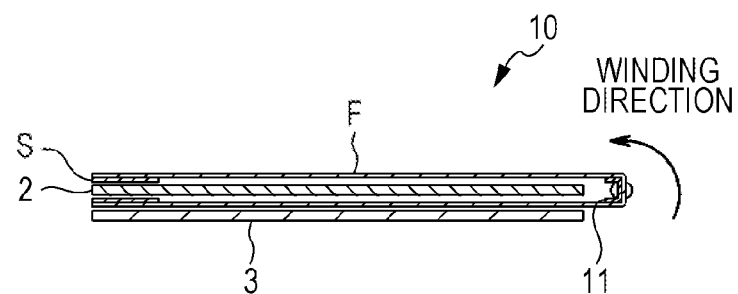
FIG. 5B shows a method for producing a spiral electrode group using the separator.
Figure 6:
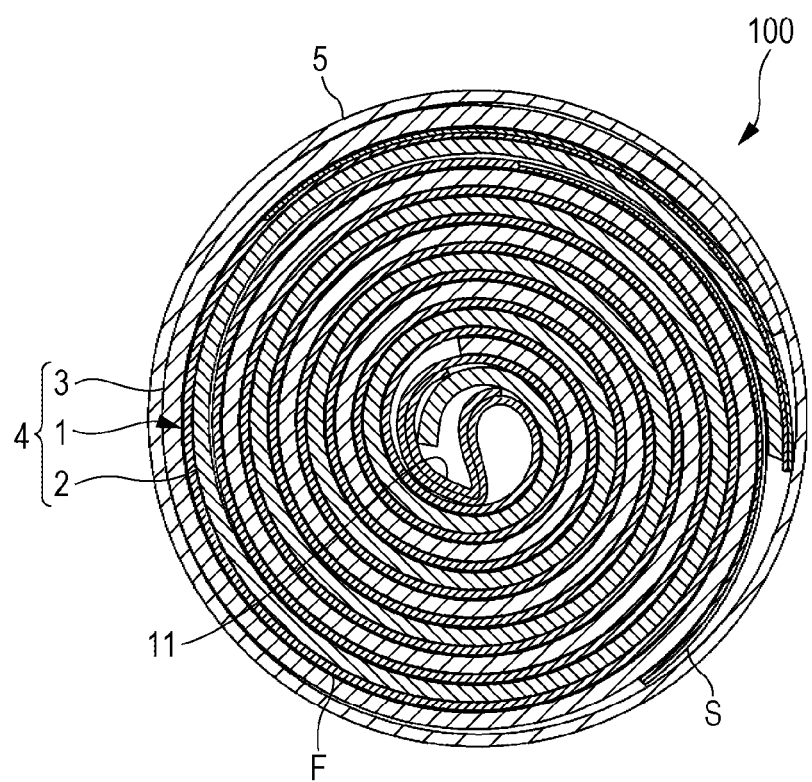
FIG. 6 is a cross-sectional view of a battery using the separator according to the third embodiment.

Specific examples of the separator according to the embodiment of the present invention include a separator of a first embodiment shown in FIGS. 1 and 2, a separator of a second embodiment shown in FIGS. 3 and 4, and a separator of a third embodiment shown in FIGS. 5 and 6, etc.

In the separator 1 of the first embodiment, as shown in FIG. 1A, sulfone group-containing regions S are formed at both ends of the separator in the longitudinal direction through a sulfonation treatment etc., and other regions F are subjected to a fluorine gas treatment. The sulfone group-containing region S and the fluorine gas treatment region F are formed as different bodies and then coupled together by ultrasonic welding etc. A subsidiary separator 11 is laminated at the center of the separator 1 in the longitudinal direction, and the subsidiary separator 11 is subjected to a fluorine gas treatment to impart excellent strength. It has been confirmed that sulfone group-containing regions have an absorption peak of infrared light at 1090 $cm^{-1}$ to 1130 $cm^{-1}$ in a Fourier-transform infrared spectrometer (Frontier manufactured by PerkinElmer Co., Ltd.) for all the embodiments in the specification of the present application.

As shown in FIG. 1B, the separator 1 of the first embodiment is folded in half at substantially the center in the longitudinal direction, a positive plate 2 is sandwiched in the middle of the folded separator, a negative plate 3 is superimposed on the outside of the separator, and a layered product 10 thus obtained is spirally wound such that the negative plate 3 is situated on the outer periphery side, thereby forming a spiral electrode group 4. A cylindrical alkaline storage battery 100 can be obtained by storing the spiral electrode group 4 in a cylindrical battery case 5 as shown in FIG. 2.

At this time, the sulfone group-containing region S is disposed on the peripheral edge of the inside of the battery case 5, and therefore comes into proper contact with an electrolyte solution retained in a gap between the spiral electrode group 4 and the battery case 5, so that nitrogen-based impurities contained in the electrolyte solution can be efficiently trapped.

Owing to the subsidiary separator 11 provided at the center of the separator 1 in the longitudinal direction, a situation can be prevented in which the separator 1 is damaged by corners, burrs and the like of the positive plate 2 sandwiched in the middle, leading to occurrence of a short-circuit.

The separator of the second embodiment will now be described, focusing on the points different from those of the separator of the first embodiment.

As shown in FIG. 3A, the separator 1 of the second embodiment has, in addition to a sulfone group-containing region S at one end of the separator 1 in the longitudinal direction, further two sulfone group-containing regions S on the same side with substantially the center in the longitudinal direction as a boundary. These total three sulfone group-containing regions S are separated by fluorine gas treatment regions F each interposed between the regions S. In the second embodiment, only one of the ends of the separator 1 in the longitudinal direction is subjected to a sulfonation treatment, and the other end is not subjected to a sulfonation treatment.

As shown in FIG. 3B, the separator 1 of the second embodiment is folded in half at substantially the center in the longitudinal direction, a positive plate 2 is sandwiched in the middle of the folded separator, a side including only fluorine gas treatment regions F is situated at the outside, and a negative plate 3 is superimposed thereon. A layered product thus obtained 10 is spirally wound such that the negative plate 3 is situated on the outer periphery side, thereby forming a spiral electrode group 4. When the spiral electrode group 4 is stored in a battery case 5, sulfone group-containing regions S are dispersed in the diameter direction of the inside of the battery case 5, so that nitrogen-based impurities dissolved in an electrolyte solution can be efficiently trapped.

The separator of the third embodiment will now be described, focusing on the points different from those of the separators of the first embodiment and the second embodiment.

In the separator 1 of the third embodiment, as shown in FIG. 5A, a region F subjected to a fluorine gas treatment is formed on the whole of one end surface of the separator, and sulfone group-containing regions S subjected to a sulfonation treatment are formed at both ends of the other end surface of the separator. The sulfone group-containing region S and the fluorine gas treatment region F are formed as different bodies and then coupled together by ultrasonic welding etc. A subsidiary separator 11 is laminated at the center of the separator 1 in the longitudinal direction, and the subsidiary separator 11 is subjected to a fluorine gas treatment to impart excellent strength.

The subsidiary separator may be made of any material and may be subjected or not subjected to a hydrophilic treatment as long as it increases the thickness of the separator and enhances the strength thereof. That is, a separator made of a polyolefin resin, which is not subjected to a hydrophilic treatment, or a separator made of a polyolefin resin, which is subjected to a hydrophilic treatment such as a sulfonation treatment, a fluorine gas treatment and a corona discharge treatment can be used.

As shown in FIG. 5B, the separator 1 of the third embodiment is folded in half at substantially the center in the longitudinal direction, a positive plate 2 is sandwiched in the middle of the folded separator, a negative plate 3 is superimposed on the outside of the separator, and a layered product 10 thus obtained is spirally wound such that the negative plate 3 is situated on the outer periphery side, thereby forming a spiral electrode group 4. A cylindrical alkaline storage battery 100 can be obtained by storing the spiral electrode group 4 in a cylindrical battery case 5.

At this time, as shown in FIG. 6, the sulfone group-containing region S is disposed on the peripheral edge of the inside of the battery case 5, and therefore comes into proper contact with an electrolyte solution retained in a gap between the spiral electrode group 4 and the battery case 5, so that nitrogen-based impurities contained in the electrolyte solution can be efficiently trapped.

Owing to the subsidiary separator 11 provided at the center of the separator 1 in the longitudinal direction, a situation can be prevented in which the separator 1 is damaged by corners, burrs and the like of the positive plate 2 sandwiched in the middle, leading to occurrence of a short-circuit.

The present invention is not limited to the foregoing embodiments.

Figure 7A:
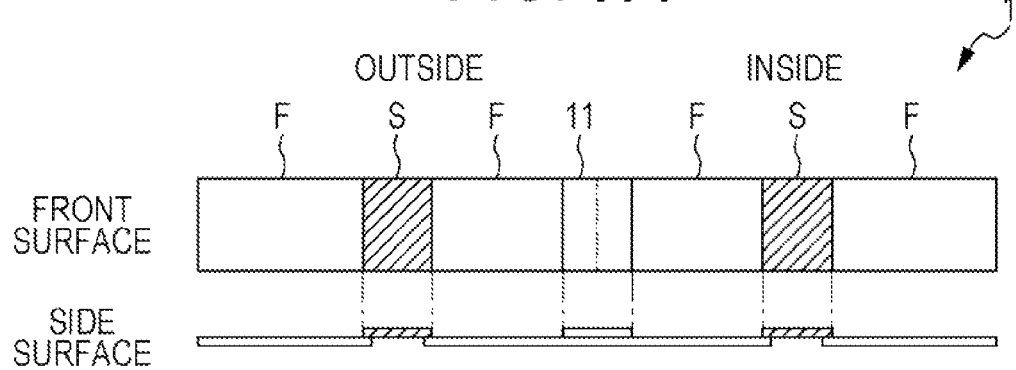
FIG. 7A shows a front view and a side view in an extended state of a separator according to another embodiment.
Figure 7B:
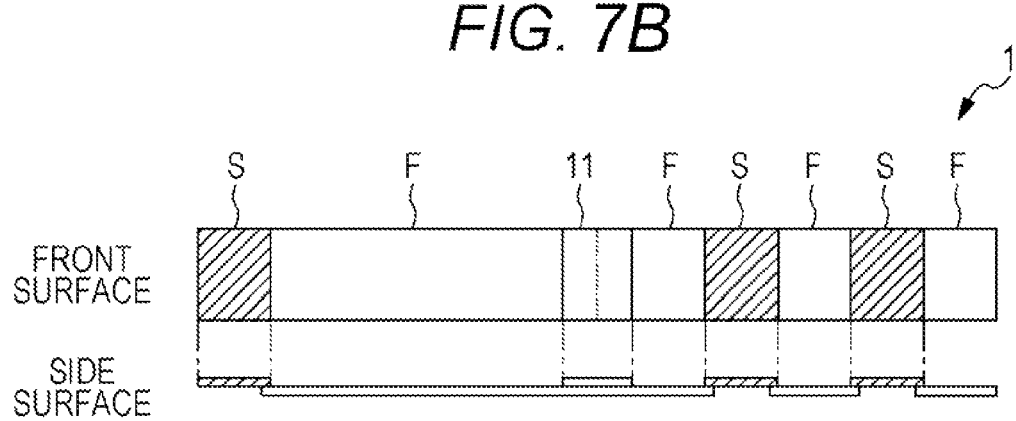
FIG. 7B shows a front view and a side view in an extended state of a separator according to another embodiment.

For example, as shown in FIG. 7A, the sulfone group-containing region S may be not formed at the end of the separator 1 in the longitudinal direction, but formed at only an inner part closer to the center. Alternatively, as shown in FIG. 7B, the sulfone group-containing region S formed at the end of the separator 1 in the longitudinal direction and the sulfone group-containing region S formed at an inner part closer to the center may be formed on opposite sides with substantially the center in the longitudinal direction as a boundary.

Further, the separator of each of the foregoing embodiments is folded in half, but for example, the separator of each of the foregoing embodiments may be separated into two separators: a separator (A) interposed between the inner periphery side of the positive plate and the outer periphery side of the negative plate and a separator (B) interposed between the outer periphery side of the positive plate and the inner periphery side of the negative plate.

By storing in a cylindrical battery case an electrode group obtained by spirally winding the separator (including the separator (A) and the separator (B) obtained by separating the separator into two separators) according to the embodiments of the present invention while being superimposed with the positive plate and the negative plate, a cylindrical alkaline storage battery can be formed. Such an alkaline storage battery also constitutes a part of the embodiment of the present invention.

When the alkaline storage battery according to the embodiments of the present invention is a nickel-metal hydride storage battery, the positive plate is formed by, for example, holding in a positive electrode substrate such as a foamed nickel porous material a positive active material containing nickel hydroxide, and the negative plate is formed by, for example, coating a negative electrode substrate composed of a perforated steel plate with a negative active material containing a hydrogen storage alloy.

Examples

The embodiment of the present invention will be described further in detail below by showing examples, but the present invention is not limited to these examples.

<Preparation of Positive Plate for Nickel-Metal Hydride Storage Battery>

The surface of nickel hydroxide containing 3% by mass of zinc and 0.6% by mass of cobalt in a solid solution state was coated with 7% by mass of cobalt hydroxide, and an air oxidation treatment was then performed at 110° C. for 1 hour using a 18 M aqueous sodium hydroxide solution to obtain a positive active material. Further, 2% by mass of $Yb_2O_3$ was mixed with the positive active material, an aqueous solution with a thickener (carboxymethyl cellulose) dissolved therein was added to prepare a paste. Foamed nickel having a substrate surface density of 300 g/m$^2$ was filled with the paste, dried, and then pressed to a predetermined thickness to form a positive plate of 2000 mAh.

<Preparation of Negative Plate for Nickel-Metal Hydride Storage Battery>

An aqueous solution with a thickener (methyl cellulose) dissolved therein was added to 100 parts by mass of a hydrogen storage alloy powder (composition: $MmNi_{3.80}Co_{0.80}Mn_{0.30}Al_{0.25}$) crushed so as to have an average particle size $D_{50}$ of 50 μm, 1 part by mass of a binder (styrene butadiene rubber) was further added to form a paste. The paste was applied to both surfaces of a perforated steel plate having a thickness of 35 μm, and dried, and the resultant was then pressed to a predetermined thickness to form a negative plate of 2600 mAh.

<Preparation of Sealed Nickel-Metal Hydride Storage Battery>

Five separators (Nos. 1 to 5) shown in FIGS. 8A to 8E were provided. The separator was folded in half from substantially the center in the longitudinal direction, the positive plate was sandwiched in the middle of the folded separator, the negative plate was superimposed on the outside of the separator, and a layered product thus obtained was wound such that the negative plate was situated on the outer periphery side, thereby forming an electrode group. The obtained electrode group was stored in a cylindrical metallic battery case, 2.45 g of an electrolyte solution containing 4 M KOH, 3 M NaOH and 0.8 M LiOH was injected, and the battery case was sealed with a metallic lid provided with a safety valve. In this way, five nickel-metal hydride storage batteries of AA size and 2000 mAh were prepared as sample batteries.

<Initial Formation>

For each sample battery, initial formation was performed in accordance with the following procedure. At 20° C., the battery was charged at 200 mA for 16 hours, and then discharged to 1 V at 400 mA. This cycle was repeated twice. Thereafter, the battery was held at 40° C. for 48 hours. At 20° C., the battery was charged at 200 mA for 16 hours, left standing for 1 hour, and discharged to 1 V at 400 mA. This cycle was repeated twice to complete formation.

<Measurement of Remaining Capacity Retention Ratio>

First, at 20° C., the battery was charged at 200 mA for 16 hours, left standing for 1 hour, and discharged to 1 V at 400 mA, and an initial discharge capacity was measured. Next, the battery was charged at 200 mA at 20° C. for 16 hours, and then held at 45° C. for 14 days. Finally, the battery was held at 20° C. for 3 hours, and then discharged to 1 V at 400 mA, and a remaining discharge capacity was measured. Based on the obtained remaining discharge capacity, a remaining capacity retention ratio was calculated in accordance with the following formula.

Remaining capacity retention ratio (%)=remaining discharge capacity (mAh)/initial discharge capacity (mAh)×100

The obtained results are shown in Table 1 below. In Table 1, the "ratio of sulfonation treatment regions" means a ratio of the area of regions subjected to a sulfonation treatment to the surface area of the separator.

TABLE 1

| No. | Ratio of sulfonation treatment regions (%) | Remaining capacity retention ratio (%) |
|---|---|---|
| 1 | 27.5 | 79.5 |
| 2 | 26.5 | 79.1 |
| 3 | 13.7 | 74.5 |
| 4 | 33.7 | 78.1 |
| 5 | 43.7 | 79.5 |

Comparison of the sample batteries Nos. 1 and 2 with the sample battery No. 4 in Table 1 shows that the sample batteries Nos. 1 and 2 had a higher remaining capacity retention ratio although the area of regions subjected to a sulfonation treatment was smaller as compared to the sample battery No. 4. The sample batteries Nos. 1 and 2 showed a remaining capacity retention ratio substantially comparable to that of the sample battery No. 5 in which the area of regions subjected to a sulfonation treatment was larger by a factor of about 1.6.

What is claimed is:

1. An alkaline storage battery comprising:
   a spiral electrode group with a positive plate and a negative plate spirally wound with a separator interposed therebetween,
   wherein the separator comprises two separate sheets of a first sheet and a second sheet, the first sheet comprising a sulfone group-containing region, and the second sheet comprising a region that is subjected to a fluorine gas treatment,
   a lower surface of the first sheet is welded to an upper surface of the second sheet,
   the separator comprises a plurality of sulfone group-containing regions, and
   the plurality of sulfone group-containing regions are separated from one another in a winding direction, and disposed to face the positive plate or the negative plate.

2. The alkaline storage battery according to claim 1, wherein at least one of the plurality of sulfone group-containing regions is disposed between an outer periphery of the electrode group and a case storing the electrode group.

3. The alkaline storage battery according to claim 1, wherein at least one of the plurality of sulfone group-containing regions is formed on one surface of the separator, the region formed on the one surface being disposed to face the positive plate or the negative plate.

4. The alkaline storage battery according to claim 1, wherein some of the plurality of sulfone group-containing regions are disposed to face both the positive plate and the negative plate.

5. The alkaline storage battery according to claim 1, wherein at least one of the plurality of sulfone group-containing regions is provided at an end of the separator in the longitudinal direction.

6. The alkaline storage battery according to claim 1, wherein at least one of the plurality of sulfone group-containing regions other than the end are disposed on one side with substantially a center of the separator in the longitudinal direction as a boundary.

7. The alkaline storage battery according to claim 6, wherein at least one of the plurality of sulfone group-containing regions other than the end is disposed to face an inner periphery side of the positive plate.

8. The alkaline storage battery according to claim 1, wherein a total of areas of the plurality of sulfone group-containing regions is less than 30% of an area of the positive plate.

9. A method for producing an alkaline storage battery, the method comprising:
   providing two separate sheets of a first sheet and a second sheet, the first sheet comprising a sulfone group-containing region, and the second sheet comprising a region that is subjected to a fluorine gas treatment,
   welding a lower surface of the first sheet to an upper surface of the second sheet to make a separator, and
   layering a positive plate, a negative plate and the separator.

10. The method for producing an alkaline storage battery according to claim 9, wherein the positive plate, the negative plate and the separator are spirally wound and layered.

11. The alkaline storage battery according to claim 1, wherein the lower surface of the first sheet is coupled with the upper surface of the second sheet with an ultrasonic weld.

12. The alkaline storage battery according to claim 1, wherein an only portion of the lower surface of the first sheet is welded to an only portion of the upper surface of the second sheet so that a total of areas of the plurality of sulfone group-containing regions is less than 30% of an area of the positive plate.

13. The method for producing an alkaline storage battery according to claim 9, wherein the method comprises ultrasonically welding the lower surface of the first sheet to the upper surface of the second sheet to make the separator.

14. The method for producing an alkaline storage battery according to claim 9, wherein the separator comprises a plurality of sulfone group-containing regions separated from one another such that the plurality of sulfone group-containing regions are disposed to face the positive plate or the negative plate.

15. The method for producing an alkaline storage battery according to claim 9, wherein the method comprises welding an only portion of the lower surface of the first sheet to an only portion of the upper surface of the second sheet so that a total of areas of the plurality of sulfone group-containing regions is less than 30% of an area of the positive plate.

* * * * *